(12) United States Patent
Murata

(10) Patent No.: US 8,947,737 B2
(45) Date of Patent: Feb. 3, 2015

(54) IMAGE PROCESSING THAT GENERATES AND DENSITY CORRECTS INK AMOUNT DATA

(75) Inventor: Masahiro Murata, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 243 days.

(21) Appl. No.: 13/359,639

(22) Filed: Jan. 27, 2012

(65) Prior Publication Data

US 2012/0194871 A1   Aug. 2, 2012

(30) Foreign Application Priority Data

Jan. 31, 2011 (JP) ................................ 2011-018722
Jan. 31, 2011 (JP) ................................ 2011-018728
Nov. 9, 2011 (JP) ................................ 2011-245930

(51) Int. Cl.
*H04N 1/405* (2006.01)
*H04N 1/60* (2006.01)

(52) U.S. Cl.
CPC ........... *H04N 1/6025* (2013.01); *H04N 1/4057* (2013.01)
USPC ........................................ 358/3.07; 358/534

(58) Field of Classification Search
None
See application file for complete search history.

(56) References Cited

U.S. PATENT DOCUMENTS

| 7,679,781 | B2 | 3/2010 | Shibuya et al. |
| 2006/0066671 | A1 | 3/2006 | Kato et al. |
| 2009/0128838 | A1* | 5/2009 | Yamamoto ..................... 358/1.9 |
| 2009/0168108 | A1* | 7/2009 | Matsushima ................ 358/3.06 |
| 2009/0179934 | A1* | 7/2009 | Takagi et al. ................... 347/15 |
| 2010/0253955 | A1* | 10/2010 | Murata ........................ 358/1.9 |

FOREIGN PATENT DOCUMENTS

| JP | 2003-338938 | 11/2003 |
| JP | 2006-088653 | 4/2006 |
| JP | 2006-279922 | 10/2006 |
| JP | 2008-205964 | 9/2008 |
| JP | 2009-141941 | 6/2009 |
| JP | 2010-147841 | 7/2010 |

* cited by examiner

*Primary Examiner* — Barbara Reinier
*Assistant Examiner* — Christopher D Wait

(57) ABSTRACT

An image processing device adjusts black separately from chromatic colors and applies density adjustment capable of controlling the amount of color material according to the density. Such image processing device, capable of communicating with an image recording device, includes a color conversion unit that converts image data expressed in a first color space to color material amount data expressed in a second color space used by an image recording device; a density adjustment unit that increases or decreases the color material amount data based on a specified adjustment value; a dot breakdown unit that converts the increased or decreased color material amount data to dot quantity data expressed as a dot quantity for each of different sizes of dots formed by the image recording device; and a halftone process unit that converts the dot quantity data to data denoting whether or not the dots are formed.

13 Claims, 10 Drawing Sheets

| | | |
|---|---|---|
| (1) | SPECIFIED DENSITY ADJUSTMENT VALUES<br>COLOR : +30%<br>BLACK : +30% | (S3) |
| (2) | PIXEL VALUES IN IMAGE DATA<br>(R,G,B)=(100,100,100) | |
| (3) | SELECTED LUT<br>LUT2 (COLOR CONVERSION TABLE 127(2))<br>MAXIMUM INK DEPOSITION : 160% | |
| (4) | CALCULATE LUT CHANGE<br>COLOR : 160% × 1.3=208%<br>BLACK : 160% × 1.3=208% | (S6) |
| (5) | SELECTED LUT<br>LUT3 (COLOR CONVERSION TABLE 127(3))<br>MAXIMUM INK DEPOSITION : 200% | (S6) |
| (6) | CALCULATE DENSITY DECREASE<br>COLOR : (208%/200% -1) × 100 → -0%<br>BLACK : (208%/200% -1) × 100 → -0% | (S7) |
| (7) | INK QUANTITY AFTER COLOR CONVERSION<br>(C,M,Y,K)=( 50%,50%,50%,50% ) | (S8) |
| (8) | INK QUANTITY AFTER<br>DECREASING COLOR DENSITY<br>(C',M',Y',K')=( 50%,50%,50%,50% ) | (S9) |
| (9) | INK QUANTITY AFTER<br>DECREASING BLACK DENSITY<br>(C',M',Y',K')=( 50%,50%,50%,50% ) | (S10) |

FIG.6

(1) DOT BREAKDOWN
C DOTS (L = 0; M = 2; S = 50)
M DOTS (L = 0; M = 2; S = 50)
Y DOTS (L = 0; M = 2; S = 50)
K DOTS (L = 20; M = 50; S = 40)

AFTER REDUCING DOT COUNT
C DOTS (L = 0; M = 1; S = 35)
M DOTS (L = 0; M = 1; S = 35)
Y DOTS (L = 0; M = 1; S = 35)
K DOTS (L = 14; M = 35; S = 28)

(2) RESULT OF DOT BREAKDOWN
C DOTS (L = 0; M = 0; S = 40)
M DOTS (L = 0; M = 0; S = 40)
Y DOTS (L = 0; M = 0; S = 40)
K DOTS (L = 0; M = 60; S = 50)

(1) SPECIFIED DENSITY ADJUSTMENT VALUES
COLOR : +50%
BLACK : +10%    (S23)

(2) PIXEL VALUES IN IMAGE DATA
(R,G,B)=(200,150,150)

(3) SELECTED LUT
LUT1 (COLOR CONVERSION TABLE 127(1))
MAXIMUM INK DEPOSITION : 120%

(7) INK QUANTITY AFTER COLOR CONVERSION
( C,M,Y,K )=( 0%,30%,30%,20% )    (S26)

(8) INK QUANTITY AFTER
DECREASING COLOR DENSITY
( C',M',Y',K' )=( 0%,45%,45%,20% )    (S32)

(9) INK QUANTITY AFTER
DECREASING BLACK DENSITY
( C',M',Y',K' )=( 0%,45%,45%,22% )    (S33)

FIG. 10

IMAGE PROCESSING THAT GENERATES AND DENSITY CORRECTS INK AMOUNT DATA

CROSS-REFERENCE TO RELATED APPLICATIONS

The present application claims priority under 35 U.S.C. §119 on Japanese Patent Application Nos. 2011-018728, filed on Jan. 31, 2011, 2011-018722, filed on Jan. 31, 2011 and 2011-245930, filed on Nov. 9, 2011, which are incorporated by reference herein in their entirety.

BACKGROUND

1. Technical Field

The present invention relates to image processing devices for printing, and relates more particularly to image processing devices that can adjust black separately from chromatic colors and apply density adjustment that is capable of controlling the amount of color material according to the density to suitably meet user needs for density adjustment.

2. Related Art

Inkjet printers and other types of printers are used for a wide range of applications. Such printers print by depositing color material onto paper or other print medium and forming dots. This type of printing process requires image processing to convert the image data to be printed to data expressing whether or not dots are formed, and this printing process is performed by a printer driver or printer controller on the host device.

Image processing includes a process to adjust density based on user needs. Density adjustment methods according to the related art include methods of adjusting the density of each color in the image data to the density corresponding to a set density value as described in Japanese Unexamined Patent Appl. Pub. JP-A-2009-141941. Under color removal (UCR) is also commonly used for density adjustment as described in Japanese Unexamined Patent Appl. Pubs. JP-A-2006-279922 and JP-A-2008-205964.

However, if the color expression of the processed data differs from the color expression of the color material used by the printer, the increase or decrease in density by the density adjustment process does not translate directly to the same increase or decrease in the amount of color material deposited on the print medium, and the increase or decrease in density may actually be reversed in some cases, when applying density adjustment to image data as described above. For example, when CMYK (cyan, magenta, yellow, black) color material is used by the printer and the image data is expressed in the RGB (red, green, blue) color space, the change in the amount of color material due to the density increase or decrease will produce different results depending on the design of the conversion process because the conversion from RGB to CMYK is not uniform. More specifically, if the adjustment process lowers the density of RGB (0, 0, 0) (that is, the color black in data in which the density of each color is expressed in 256 levels) 10%, the resulting values are (20, 20, 20). If these values are then converted to CMYK data (data representing the surface coverage of color material per unit area proportional to the amount of color material), the resulting values are (10%, 10%, 10%, 75%). However, converting the original RGB value of (0, 0, 0) directly to the CMYK space results in (10%, 10%, 10%, 75%), and even though the result of density adjustment is a density decrease of 10%, the amount of color material increases ((100% (K)->105% (CMYK total)).

The purpose of reducing density through density adjustment includes, for example, preventing bleed-through and bleeding in the paper (print medium), and reducing the cost of ink (color material) used for printing. This requires reducing the amount of color material that is physically deposited in addition to reducing the visible density, but the actual reduction in color material in the above situation is difficult to determine and adjustment is difficult.

Another reason for increasing density in density adjustment is to solve the problem of so-called "insufficient fill" in the printout, but this requires suitably increasing the amount of color material according to the increase in density, and is not possible under the conditions described above.

Under color removal methods such as described above are methods of removing and replacing color ink with black ink. However, such methods are difficult to use when adjusting black separately from other colors is desirable.

For example, reducing total ink deposition by a specified amount without reducing the quality of black text and barcodes and without increasing the amount of black ink is difficult using such UCR methods.

SUMMARY

An object of the present invention is therefore to provide an image processing device for printing that can adjust black separately from other colors and apply density adjustment that can control the amount of color material according to the density to appropriately meet the user's need for density adjustment.

A first aspect of the invention is directed to an image processing device that is capable of communicating with an image recording device. Such image processing device includes a color conversion unit that converts image data expressed in a first color space to color material amount data expressed in a second color space for use by an image recording device; a density adjustment unit that increases or decreases the color material amount data based on a specified adjustment value; a dot breakdown unit that converts the increased or decreased color material amount data to dot quantity data expressed as a dot quantity for each of different sizes of dots to be formed by the image recording device; and a halftone process unit that converts the dot quantity data to data denoting whether or not the dots are formed.

In an image processing device according to another aspect of the invention, the adjustment value is preferably specified separately for a chromatic color and black; and the density adjustment unit increases or decreases the color material data for chromatic color based on the adjustment value specified for chromatic color, and increases or decreases the color material data for black based on the adjustment value specified for black.

In an image processing device according to another aspect of the invention, multiple color conversion tables correlate the image data and the color material amount data so that the total color material is within a limit value. The color conversion tables have different limit values; and the color conversion unit selects the color conversion table based on the specified adjustment value, and applies the conversion using the selected color conversion table.

In an image processing device according to another aspect of the invention, the color conversion unit selects a color conversion table with a greater limit value than a reference color conversion table when the specified adjustment value denotes a density increase.

In an image processing device according to another aspect of the invention, when the color material amount data produced by the conversion process of the color conversion unit is increased to a value exceeding the density increase denoted by the specified adjustment value as a result of selecting a color conversion table with a high limit value, the density adjustment unit reduces the excess amount.

In an image processing device according to another aspect of the invention, when the maximum of the total color material amount of the color material amount data obtained after processing by the density adjustment unit does not exceed the limit value of the reference color conversion table when the reference color conversion table is used, the color conversion unit selects the reference color conversion table.

Another aspect of the invention is directed to an image processing method. Such method includes performing a color conversion that converts image data expressed in a first color space to color material amount data expressed in a second color space used for printing; adjusting the density by increasing or decreasing the color material amount data based on a specified adjustment value; converting the increased or decreased color material amount data to dot quantity data expressed as a dot quantity for each of different sizes of dots to be formed on a print medium; and converting the dot quantity data to data denoting whether or not the dots are formed.

Another aspect of the invention is a non-transitory computer-readable recording medium containing an image processing program that, when executed, causes an image processing device to execute steps commensurate with the method described above.

Other objects and attainments together with a fuller understanding of the invention will become apparent and appreciated by referring to the following description and claims taken in conjunction with the accompanying drawings.

BRIEF DESCRIPTION OF THE DRAWINGS

FIG. 6 shows a second example of data transformation.

FIG. 10 describes data transformation in another embodiment of the invention.

DESCRIPTION OF EMBODIMENTS

Figure 1:
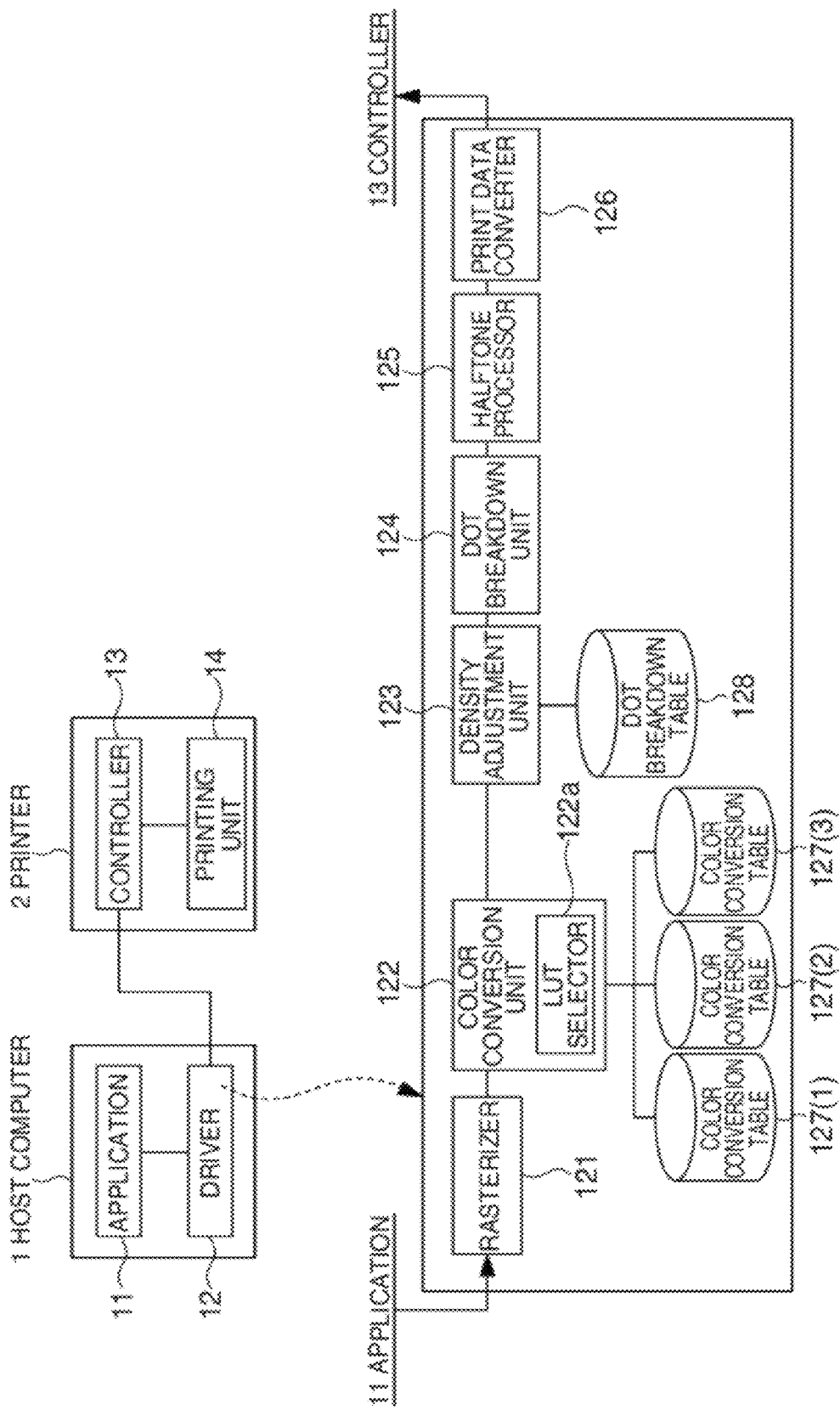
FIG. 1 is a block diagram showing the configuration of an image processing device according to the invention.

Preferred embodiments of the present invention are described below with reference to the accompanying figures. It will be apparent to one with ordinary skill in the related art that the invention is not limited to the embodiments described below. Note further that identical or like parts are identified by the same reference numerals in the accompanying figures.

FIG. 1 shows the configuration of an image processing device according to a preferred embodiment of the invention. The host computer 1 shown in FIG. 1 is an image processing device to which the invention may be applied, and is primarily characterized by the density adjustment unit 123 separately applying to black and other colors (chromatic colors) a density adjustment process specified by the user to the ink volume data (color material amount data) after processing by the color conversion unit 122. This device can separately adjust the density of chromatic colors and black, and control the amount of color material according to the density, and can appropriately meet user needs for density adjustment.

FIG. 1 describes the functional configuration of this embodiment of the invention. The host computer 1 acts as a host device for printer 2 and sends print commands to the printer 2 (image recording device). Host computer 1 can be rendered by a personal computer, for example. Therefore, while not shown in the figure, the host computer 1 includes a CPU (control unit) that executes processes in cooperation with an application 11 and driver 12, as well as RAM, ROM, hard disk drive, display, and operating devices.

The application 11 generates print requests, and could be an application with a variety of functions, including a word processing application or an image processing application. The application 11 may be rendered by a program specifying process content, which program resides in RAM and is executed by the CPU according to the program, and RAM, which results in the output of image data representing the print content when printing is requested.

The driver 12 is a driver for the printer 2, applies an image process to image data output from the application 11 to produce image data (print data) for the printer 2, sends the print data to the printer 2, and executes a print command to print as requested by the application 11.

The driver 12 may be a driver program that specifies process content and that is executed by the CPU according to the program to process print data. The specific functional configuration and process content of the driver 12 are described below. The driver program is preferably stored on the hard disk drive of the host computer 1 and may be copied to the host computer 1 from a CD or other recording medium, or downloaded from the Internet or other network.

The printer 2 is a line head inkjet printer, for example, that executes a printing process according to print commands from the host computer 1. As shown in FIG. 1, the printer 2 includes a controller 13 and a printing unit 14.

The controller 13 is a part that receives print data a a result of a print command and causes the printing unit 14 to execute a printing process according to the print data. More specifically, the controller 13 is rendered by the foregoing program describing the process content, a CPU that executes a process according to the program, RAM, ROM that stores a program, or an ASIC device, for example.

The printing unit 14 is a part that actually executes the printing process on paper or other print medium according to instructions from the controller 13. This printing unit 14 includes a line head with a plurality of nozzles that eject ink as the color material onto the print medium, and a conveyance mechanism that conveys the print medium at a specific speed. The printing unit 14 uses four-color process CMYK (cyan, magenta, yellow, black) inks as the color material and discharges ink from separate nozzles for each color. Printing is done by depositing the discharged ink onto the print medium to form dots. The line head is, for example, divided into a plurality of head units that are staggered to each other in a zigzag pattern.

The functional configuration of the driver 12 shown in FIG. 1 is described next. Rasterizer 121 is a part that applies a rasterizing process to the image data received from the application 11 and generates bitmap data in a first color space such as the RGB (red, green, blue) color space.

Color conversion unit 122 is a part that converts the bitmap data to ink quantity data, that is, data expressed in the CMYK color space, which is the color space (second color space) of the color material, according to a color conversion table 127.

Color conversion tables 127 are preconfigured look-up tables (LUTs) for storing ink quantity data for the CMYK colors corresponding to RGB gray scale values (data expressed in 256 levels from 0 to 255, for example). This ink quantity data is data that expresses the surface coverage of the color material for each pixel, and is proportional to the ink quantity. The ink quantity data can also be expressed by ink weight or volume, for example. Color conversion tables 127 are designed for different types of print media (types of paper), resolution, or other print conditions, and are stored on the hard disk drive, for example. This embodiment of the invention has three color conversion tables 127 (1), 127 (2), and 127 (3) corresponding respectively to low density, medium density, and high density. More specifically, if the total of the ink quantity data for all color materials (CMYK) is the total ink deposition, the color conversion tables 127 are designed with limits (maximums) of 120%, 160%, and 200% for low density, medium density, and high density, respectively. Therefore, regardless of the image data values before color conversion, the total of the ink quantity data values resulting from conversion using the color conversion tables 127 (the total amount of color material) will not exceed the limit of the total ink deposition for each color (maximum total ink deposition).

The color conversion unit 122 has a LUT selector 122a that selects one of the plural (three in the illustrated embodiment) color conversion tables 127. The LUT selector 122a selects the appropriate color conversion table 127 according to the density adjustment command of the user and the print conditions during the color conversion process, and the color conversion process is applied according to the selected color conversion table 127.

The color conversion tables 127 are created in advance using a known method and stored in the same way as the driver program described above.

The density adjustment unit 123 is a part that applies a density adjustment process to the ink quantity data after the color conversion process. The density adjustment unit 123 executes a process that separately changes the color (CMY) ink quantity data and the black (K) ink quantity data according to the density adjustment values specified by the user.

Next, the dot breakdown unit 124 is a part that converts the ink quantity data after density adjustment according based on a dot breakdown table 128 to data expressed by a dot formation amount. In this embodiment of the invention there are three sizes of dots that can be formed on the print medium by ejecting ink from the nozzles, that is, small (S), medium (M), and large (L) dots, and the ink quantity data (0% to 100%) before conversion is converted to data expressing the number of dots of these three sizes that are formed. Each pixel is divided into a matrix, and the number of dots of each size that are formed represents the number of dots that are formed in each part of the matrix using a value from 0 to 4096, for example.

The dot breakdown table 128 is a table that correlates the number of dots of these three sizes to the CMYK ink quantity data (0%-100%), and is stored on the hard disk drive, for example. The method of storage is the same as that of the driver program described above.

Figure 2:
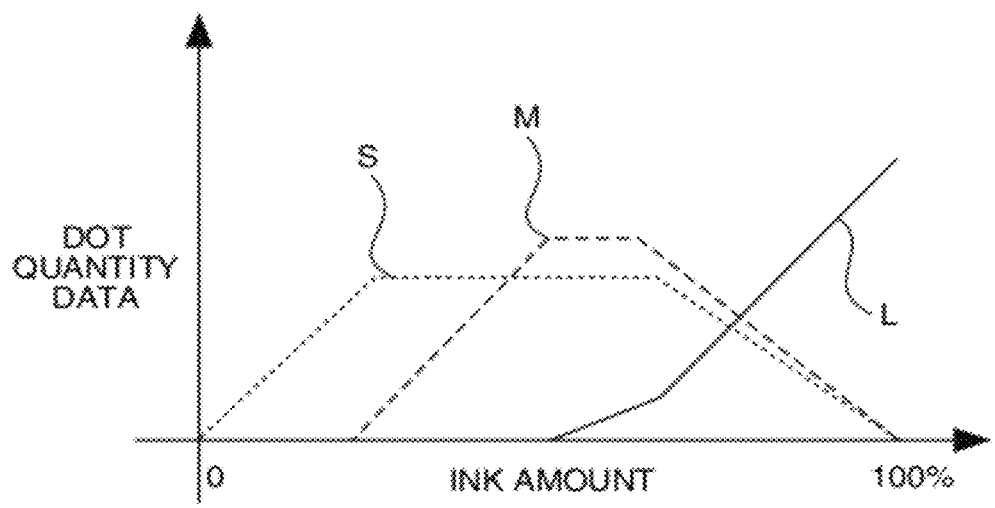
FIG. 2 shows an example of a dot breakdown table 128.

FIG. 2 shows an example of the dot breakdown table 128 as a graph. In the graph in FIG. 2 the x-axis shows the ink quantity or amount (data) before dot breakdown, and the y-axis shows the dot quantity (data) after dot breakdown. The lines S, M, and L in the graph respectively denote the number of small dots, medium dots, and large dots. As will be understood from the figure, when the ink quantity is low, only small dots are formed and the density is low, and when the ink quantity is high, dots of three sizes including large dots are formed and high density printing is performed.

The halftone processor 125 is a part that executes a halftone process and converts the data converted to a dot quantity to data expressing whether or not dots of each size are formed. A conventional dithering method or error diffusion method, for example, can be used for the halftone process.

The print data converter 126 is a part that converts the data resulting from the halftone process to print data expressed by commands for the printer 2.

Figure 3:
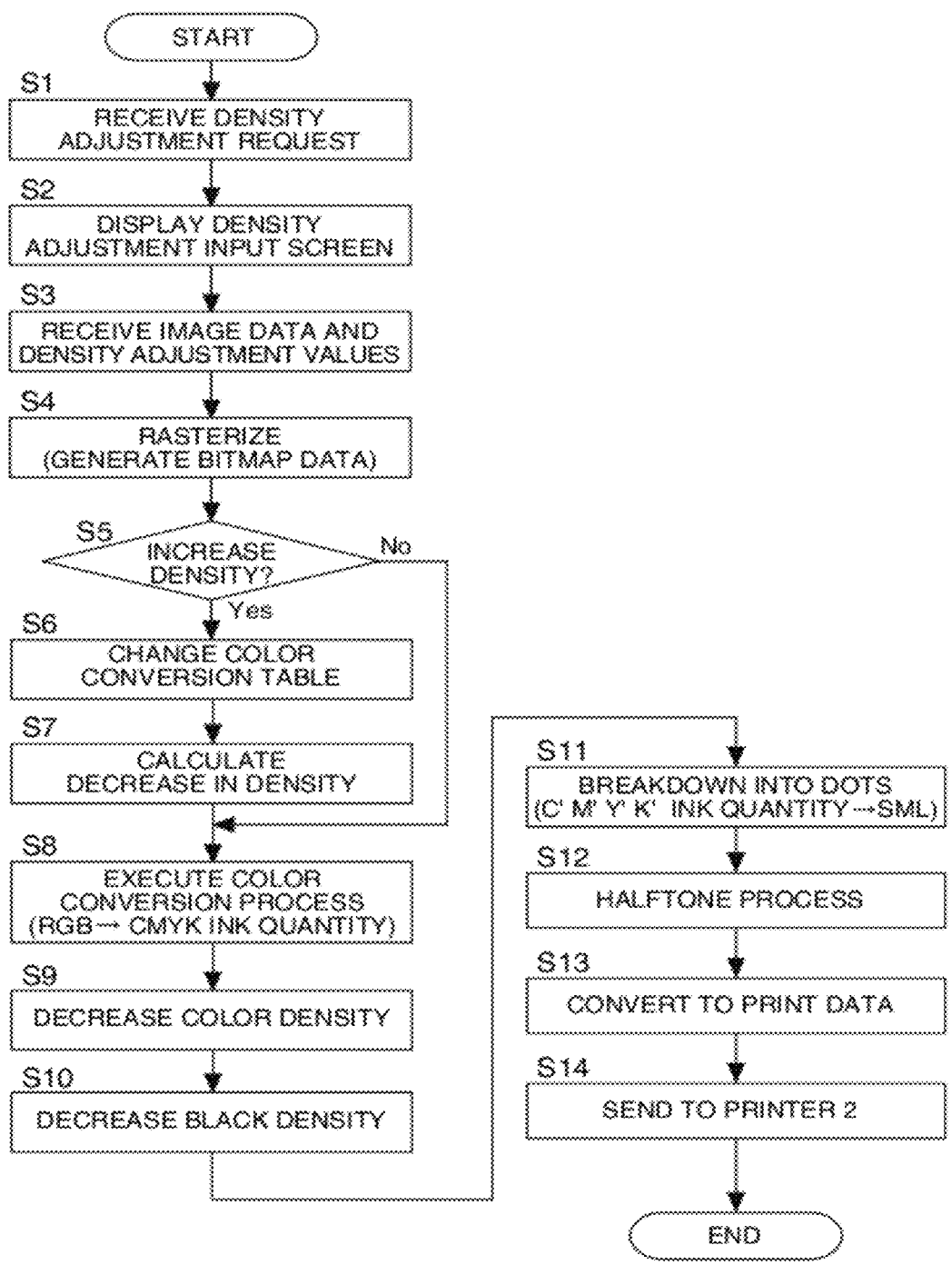
FIG. 3 is a flow chart of steps in a process performed by a driver 12.

The image process described below is executed by the driver 12 of the embodiment configured as described above. FIG. 3 is a flow chart of the process executed by the driver 12. The specific content of this image process is described below based on FIG. 3.

When the user of the application 11 described above executes a density adjustment request operation when sending a print request, the density adjustment request is received by the driver 12 (step S1). After receiving the request, the driver 12 displays a density adjustment input screen on the display device of the host computer 1 (step S2).

Figure 4:
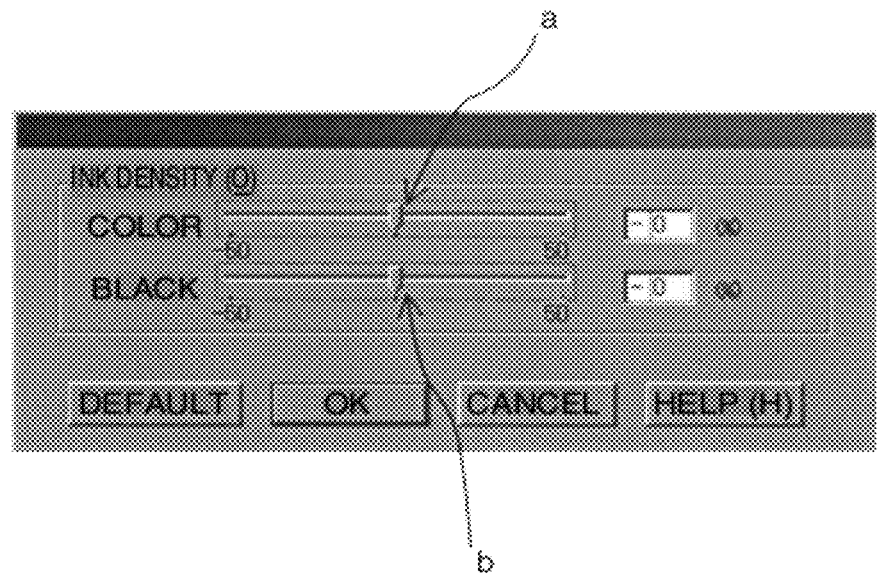
FIG. 4 shows an example of a density adjustment input screen.

FIG. 4 shows an example of the density adjustment input screen. The user can adjust the density of black separately from other colors in the input screen by using slider (a) in the figure to adjust color density and slider (b) in the figure to adjust black density. For example, the density of both could be increased 30% (+30%, +30%), or color density could be decreased 30% while decreasing black density 10% (−30%, −10%).

Returning to FIG. 3, when the user adjusts the density in the displayed input screen as described above, the input density adjustment values (the two density adjustment values (%) input with the sliders) and the image data from the application 11 to be printed are received by the driver 12 (step S3).

Because the image data received at this stage usually represents data objects such as text, graphics, or pictures, the rasterizer 121 executes the rasterizing process and converts the image data to bitmap data (step S4). More specifically, the rasterizer 121 converts each pixel to gray scale values (0-255) for each color in the RGB color space. A method known from the literature can be used for rasterizing.

The resulting bitmap data is then passed to the color conversion unit 122, and a color conversion process using the color conversion tables 127 described above is executed. More specifically, the LUT selector 122a selects the color conversion table 127 suitable to the print conditions contained in the image data, or selects a default color conversion table 127, as the reference table.

The LUT selector 122a then determines if the received density adjustment values mean an adjustment that increases density (if the density adjustment value is positive) (step S5). If not, or more specifically if density adjustment is not applied or if the density adjustment value means an adjustment that decreases density (if the density adjustment value is negative) (step S5 returns No), the process goes to step S8 for processing using the selected reference color conversion table 127.

If the density adjustment values mean an adjustment that increases density (step S5 returns Yes), the LUT selector 122a changes the color conversion table 127 to be used (step S6). That is, the LUT selector 122a changes the selected color conversion table to a color conversion table 127 for high density printing than the above reference table. More specifically, a color conversion table 127 with a maximum total ink deposition greater than or equal to the product $(X \times (1+Y$ %/100%)) of the maximum total ink deposition (X) of the reference table times the higher density adjustment value (+Y %).

The color conversion unit 122 then determines the density decrease required by changing the table (step S7). This is determined by computing equations (1) and (2) below.

$$\text{color density decrease (\%)} = (X \times (1+Y1/100)/Z-1) \times 100 \quad (1)$$

$$\text{black density decrease (\%)} = (X \times (1+Y2/100)/Z-1) \times 100 \quad (2)$$

Note that X is the maximum total ink deposition (%) of the reference table; Y1 is the color density adjustment value (%); Y2 is the black density adjustment value (%); and Z is the maximum total ink deposition (%) of the color conversion table 127 after the table is changed.

The color conversion unit 122 then executes the color conversion process (step S8) using the color conversion table 127 selected at that time, that is, the reference table when density is not increased, and the table that was substituted when density is increased. More specifically, the color conversion unit 122 refers to the color conversion table 127 and sequentially converts the RGB values for each pixel in the bitmap data that was generated to the CMYK values corresponding to those data values in the color conversion table 127, and generates ink quantity data in which each pixel is expressed by an amount of ink for each CMYK color.

When this color conversion process is performed, the resulting ink quantity data is passed to the density adjustment unit 123, which performs the density adjustment process (steps S9, S10). That is, the density adjustment unit 123 performs a process based on the amount of ink for each (CMY) color and the amount of ink for black (K) that decreases the density (decreases the values) of each. More specifically, the density adjustment unit 123 executes a process based on the ink quantity data that decreases each CMY value according to the color density reduction value, and decreases the value of K according to the density reduction value for black. The color density reduction value and the black density reduction value are the density adjustment values input by the user when the density adjustment specified by the user is not an increase, and are the color density decrease and black density decrease obtained in step S7 when the density adjustment specified by the user is an increase.

The ink quantity data (C', M', Y', K') after density adjustment is passed to the dot breakdown unit 124, and a dot breakdown process is applied to each dot in the adjusted data (step S11). This process is performed by the dot breakdown unit 124 using the dot breakdown table 128 described above, and more specifically converts the (C', M', Y', K') ink quantity data for each pixel to (S, M, L) dot quantity data for each dot based on the dot breakdown table 128.

The converted data is then passed to the halftone processor 125 where the halftone process is applied (step S12). The dot quantity data (S, M, L) for each color of each pixel is converted to data denoting if small, medium, and large dots are formed or not (on/off).

The halftone data is then converted by the print data converter 126 to print data (commands) for the printer 2 (step S13), and sent to the printer 2 (step S14). The output print data is then received by the controller 13, and a printing process is performed according to the print data. More specifically, ink is ejected from each nozzle according to the print data, and small, medium, and large dots are formed on the print medium. Printing is thus done using an ink quantity reflecting the density adjustment specified by the user.

Figure 5:
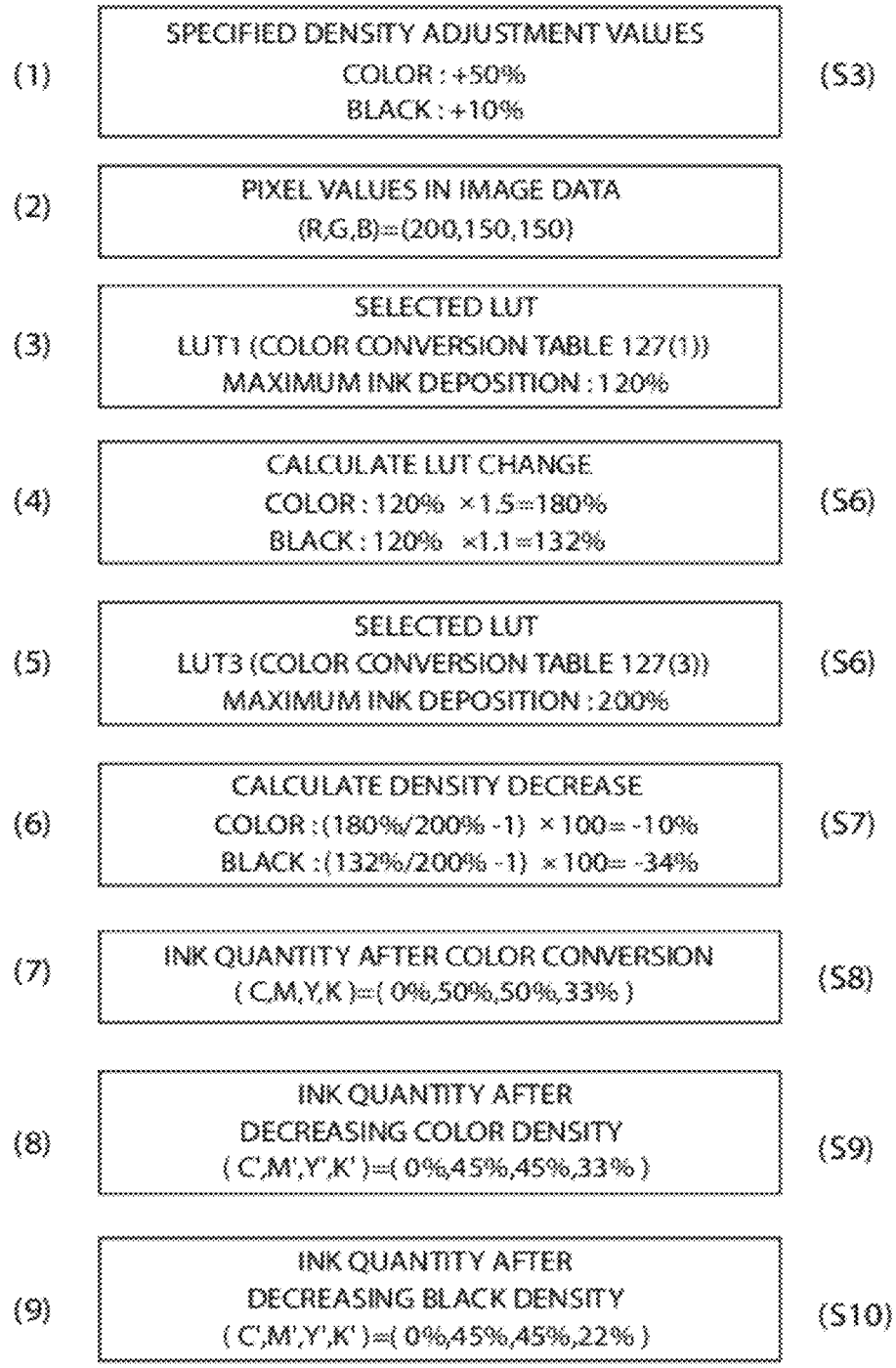
FIG. 5 shows a first example of data transformation.

A specific example of the part of the foregoing image process relating to density adjustment is described next. FIG. 5 shows the data transformation in a first specific example. This first specific example describes a case in which the density adjustment values specified by the user and received in step S3 are +50% for color and +10% for black as shown in FIG. 5 (1).

As shown in FIG. 5 (2), the RGB values that are the pixel data for one target pixel are (200, 150, 150), and as shown in FIG. 5 (3) the table selected as the reference table by the LUT selector 122a is color conversion table 127(1) (LUT1 in this example) in which the maximum total ink deposition is 120%.

Because the specified density adjustment is an increase in this first example, the color conversion table 127 is changed according to step S6, and as shown in FIGS. 5 (4) and (5), color conversion table 127(3) (LUT3 in this example) with a maximum total ink deposition of 200%, which exceeds the value of 180% obtained by increasing the maximum total ink deposition of 120% in LUT1 by the greater density adjustment value of 50%, is selected as the table after table substitution.

The decrease in color density and black density is then calculated as shown in FIG. 5 (6) by the process of step S7. As a result, the decrease in color density is −10%, and the decrease in black density is −34%.

The color conversion process using the selected LUT3 is then applied by the process of step S8 as shown in FIG. 5 (7), and CMYK ink quantity data is generated. The ink quantity data for the target pixel becomes (C, M, Y, K)=(0%, 50%, 50%, 33%).

The density adjustment (decrease) process is then performed by the process in step S9 as shown in FIG. 5 (8). The ink quantity values for (C, M, Y)=(0%, 50%, 50%) are reduced 10% according to the acquired density decrease of −10%, and become (C', M', Y')=(0%, 45%, 45%).

The density adjustment (decrease) process is then applied to the black ink quantity of the target pixel by the process in step S10 as shown in FIG. 5 (9). The ink quantity value for (K)=(33%) is reduced 34% according to the acquired density decrease of −34%, and becomes (K')=(22%).

The density adjustment process is thus executed in this first example. The color conversion table 127 is thus changed to increase density in this first example, and excessive increase in density resulting from this table substitution is adjusted later.

A second example is described next. FIG. 6 shows the data transformation in a second specific example. This second specific example describes a case in which the density adjustment values specified by the user and received in step S3 are +30% for color and +30% for black as shown in FIG. 6 (1).

As shown in FIG. 6 (2), the RGB values that are the pixel data for one target pixel are (100, 100, 100), and as shown in FIG. 6 (3) the table selected as the reference table by the LUT selector 122a is color conversion table 127(2) (LUT2 in this example) in which the maximum total ink deposition is 160%.

Because the specified density adjustment is an increase in this second example, the color conversion table 127 is changed according to step S6, and as shown in FIGS. 6 (4) and (5), color conversion table 127(3) (LUT3 in this example) with a maximum total ink deposition of 200% is selected as the table after table substitution based on the value of 208% obtained by increasing the maximum total ink deposition of 160% in LUT2 by the density adjustment value of 30%. Note that as described in this example the color conversion table 127 with the greatest maximum total ink deposition is selected when there is not a color conversion table 127 with a maximum total ink deposition exceeding the increased value.

The decrease in color density and black density is then calculated as shown in FIG. 6 (6) by the process of step S7. However, because an excessive increase does not result from the table substitution in this case, the color density decrease and black density decrease is 0%. Note, further, that because the difference between the adjusted value of 208% and the maximum total ink deposition of 200% in LUT3 is not great, the density adjustment desired by the user can largely be achieved.

The color conversion process using the selected LUT3 is then applied by the process of step S8 as shown in FIG. 6 (7), and CMYK ink quantity data is generated. The ink quantity data for the target pixel becomes (C, M, Y, K)=(50%, 50%, 50%, 50%).

The density adjustment (decrease) process is then performed by the process in step S9, but because the color density adjustment is 0%, the ink quantity values for (C, M, Y) remain (50%, 50%, 50%) as shown in FIG. 6 (8).

The density adjustment (decrease) process is likewise applied to the black ink quantity of the target pixel by the process in step S10, but because the black density adjustment is 0%, the black ink quantity remains K=(50%) as shown in FIG. 6 (9).

The density adjustment process is thus executed in this second example. A color conversion table 127 for increasing density is thus substituted in this second example, but because excessive increase in density does not result from this table substitution, a later adjustment process is not applied.

Note that when density adjustment (increase) is applied to the RGB values of the image data in this second example, a target pixel of (R, G, B)=(100, 100, 100) will be adjusted to (R', G', B')=(50, 50, 50), and the ink quantity values obtained from the subsequent color conversion process become (C, M, Y, K)=(20%, 20%, 20%, 70%). However, if color conversion is applied to a pixel of (R, G, B)=(100, 100, 100) without density adjustment, the result is (C, M, Y, K)=(35%, 35%, 35%, 45%). Total ink deposition is 150% when density adjustment is not applied, and 130% when density adjustment is applied. As a result, the ink quantity is decreased even though density is increased.

If a process that simply increases the ink quantity after color conversion as directed without changing the color conversion table 127 is performed in this second example, the color conversion process results in ink quantity data of (C, M, Y, K)=(40%, 40%, 40%, 40%), and because the ink quantities are then increased 30%, the ink quantity data after density adjustment becomes (C', M', Y', K')=(52%, 52%, 52%, 52%). In this case, the total ink deposition is 208% and exceeds the 200% maximum total ink deposition of the high density LUT3. This results in ink deposition exceeding the design limit, and is undesirable because of bleeding and bleed-through problems.

Figure 7:
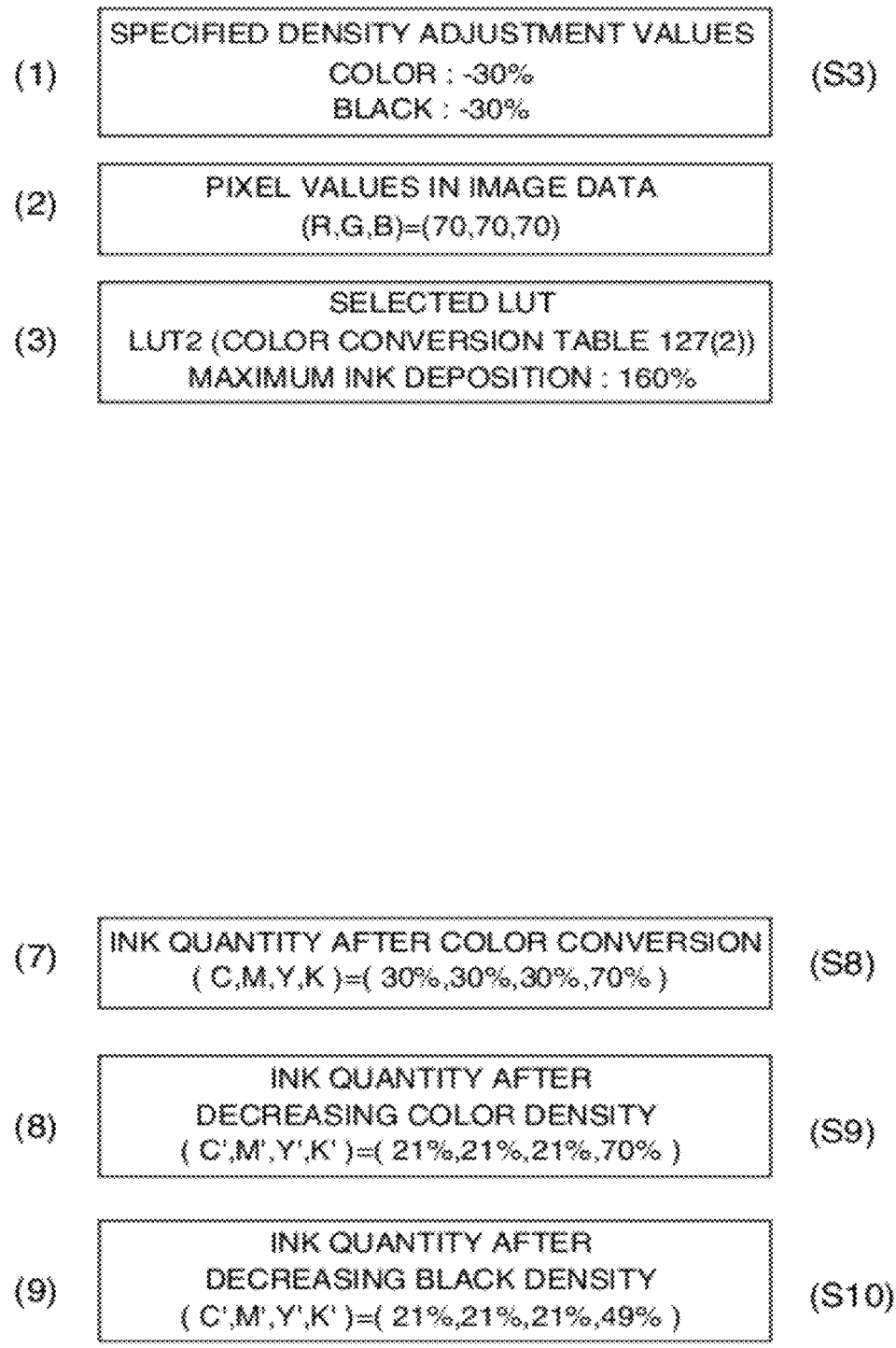
FIG. 7 shows a third example of data transformation.

A third example is described next. FIG. 7 shows the data transformation in a third specific example. This third specific example describes a case in which the density adjustment values specified by the user and received in step S3 are −30% for color and −30% for black as shown in FIG. 7 (1).

As shown in FIG. 7 (2), the RGB values of the target pixel are (70, 70, 70), and as shown in FIG. 7 (3) the table selected as the reference table by the LUT selector 122*a* is color conversion table 127 (2) (LUT2 in this example) in which the maximum total ink deposition is 160%.

Because the specified density adjustment is a decrease in this third example, the color conversion table 127 is not changed, the color conversion process is applied in step S8 using the reference table LUT2, and CMYK ink quantity data is generated as shown in FIG. 7 (7). The ink quantity data of the target pixel thus becomes (C, M, Y, K)=(30%, 30%, 30%, 70%).

The density adjustment (decrease) process is then applied to the color ink quantity of the target pixel. The ink quantity values for (C, M, Y)=(30%, 30%, 30%) are reduced 30% according to the specified density adjustment of −30%, and become (C', M', Y')=(21%, 21%, 21%).

The density adjustment (decrease) process is likewise applied to the black ink quantity of the target pixel by the process in step S10 as shown in FIG. 7 (9). The ink quantity value for (K)=(70%) is reduced 30% according to the specified density adjustment value of −30%, and becomes (K')=(49%).

The density adjustment process is thus executed in this third example. The color conversion table 127 is not changed because density is decreased in this third example, and density adjustment is applied to the ink quantity data after the color conversion process using the reference table.

Note that when density adjustment (decrease) is applied to the RGB values of the image data in this third example, a target pixel of (R, G, B)=(70, 70, 70) will be adjusted to (R', G', B')=(100, 100, 100), and the ink quantity values obtained from the subsequent color conversion process become (C, M, Y, K)=(35%, 35%, 35%, 45%). However, if color conversion is applied to a pixel of (R, G, B)=(70, 70, 70) using the same table without density adjustment, the result is (C, M, Y, K)=(30%, 30%, 30%, 70%). Total ink deposition is 160% when density adjustment is not applied, and 150% when density adjustment is applied. As a result, the ink quantity does not decrease appreciably even though a density decrease of −30% is specified.

Figure 8:
FIG. 8 shows an example of the dot breakdown process in the third example.

Applying density adjustment (decrease) after the dot breakdown process of the dot breakdown unit 124 in this third example is considered next. FIG. 8 shows an example of the result of the dot breakdown in this third example. FIG. 8 (1) shows a case in which the density is decreased after the dot breakdown process. The top line shows the dot quantity data for the above target pixel before density adjustment, and the bottom line shows the result of applying a −30% density adjustment to this data.

FIG. 8 (2) shows the dot quantity data for the target pixel obtained as the result of step S11 after adjusting density using the method of this embodiment of the invention.

To compare both cases, medium dots are formed in relatively low density colors (CMY) and large dots are formed in black (K) where the density is not high in the former case shown in FIG. 8 (1), but such medium dots and large dots are not formed in the latter case shown in FIG. 8 (2). The former case results in the formation of dots that are undesirable in terms of image quality, such as graininess in the printout.

A variation of the foregoing embodiment is described below. The configuration of the device according to this variation is the same as the configuration of the embodiment shown in FIG. 1. The difference with the embodiment described above is that if the maximum total ink deposition after density adjustment (the maximum total color material) is within the maximum total ink deposition of the reference table when density adjustment is an increase, the color conversion table 127 is not changed to a high density. This difference with the foregoing embodiment is described below.

Figure 9:
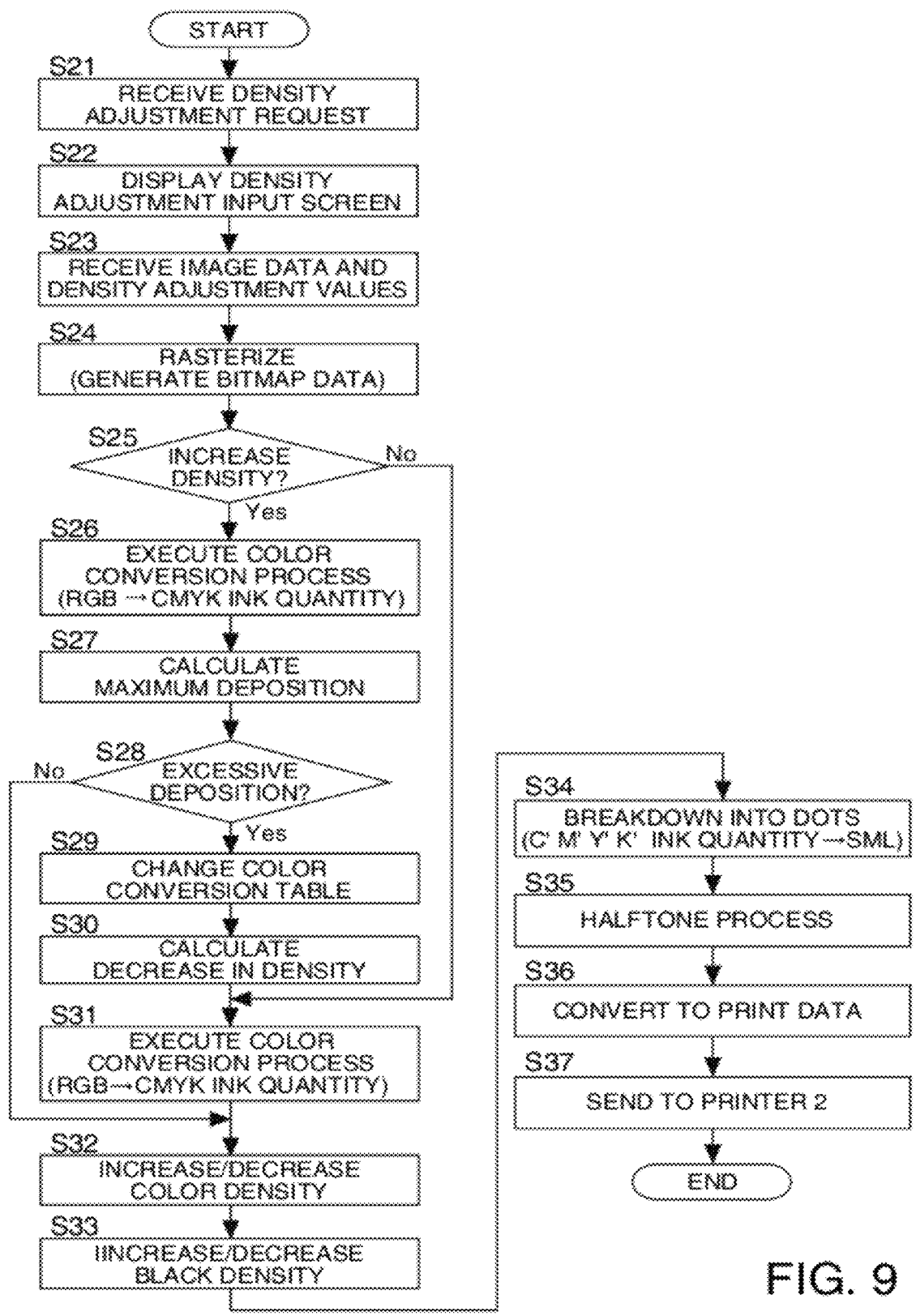
FIG. 9 is a flow chart of the image processing steps in another embodiment of the invention.

FIG. 9 is a flow chart of steps in the image process according to this variation. Steps S21 to S24 in FIG. 9 are the same as steps S1 to S4 in FIG. 3. If the density adjustment specified by the user is not an increase (step S25 returns No), the next steps (steps S31 to S37) are also the same as in FIG. 3 (steps S8 to S14 when step S5 returns No).

If the decision of step S25, that is, determining if the density adjustment specified by the user is an increase, determines that the adjustment is an increase (step S25 returns Yes), the color conversion unit 122 first converts the RGB image data to CMYK ink quantity data with reference to the reference color conversion table 127 (step S26).

Next, the color conversion unit 122 increases each ink quantity of each pixel according to the density adjustment value received in step S23, and obtains the total ink quantity of each pixel after the increase. For example, if the density adjustment value is +20% for both color and black, a pixel of (C, M, Y, K)=(30%, 30%, 30%, 30%) is multiplied by 1.2 (120%) and becomes (36%, 36%, 36%, 36%), and 144% is obtained as the total ink quantity.

The color conversion unit 122 then uses the total ink quantity value that is greatest among all pixels as the greatest total ink deposition after density adjustment (step S27), and compares this value with the maximum total ink deposition of the above reference table (step S28).

As a result, if the maximum total ink deposition after density adjustment is great and the amount of ink deposition is excessive (step S28 returns Yes), the color conversion table 127 that the LUT selector 122a uses is changed (step S29). This change changes to a color conversion table 127 with a maximum total ink deposition greater than or equal to the maximum total ink deposition after density adjustment. The color conversion unit 122 then calculates the density decrease in the same way as step S7 above (step S30).

Steps S31 to S37 are then the same as steps S8 to S14 in FIG. 3.

However, if in step S28 the actual maximum total ink deposition does not exceed the maximum total ink deposition of the reference table (step S28 returns No), the density adjustment unit 123 applies the process increasing color and black density to the color conversion result of step S26, that is, the result of color conversion using the reference table (step S32, S33). More specifically, each CMY value is increased according to the color density adjustment value, and the value of K is increased according to the black density adjustment value, in the ink quantity data of the color conversion result.

The following steps S34 to S37 are the same as S11 to S14 in FIG. 3.

FIG. 10 shows an example of data transition in the variation described above. The example in FIG. 10 shows results for the same conditions as the example shown in FIG. 5. This example therefore describes a case in which the density adjustment values specified by the user and received in step S23 are +50% for color and +10% for black as shown in FIG. 10 (1).

As shown in FIG. 10 (2), the RGB values that are the pixel data for the target pixel are (200, 150, 150), and as shown in FIG. 10 (3) the table selected as the reference table by the LUT selector 122a is color conversion table 127(1) (LUT1 in this example) in which the maximum total ink deposition is 120%.

Because the density adjustment is an increase in this example, the color conversion table 127 is changed to LUT3 in the case shown in FIG. 5. In this case, however, the maximum total ink deposition after density adjustment does not exceed the maximum total ink deposition of LUT1, reference table LUT1 continues to be used as shown in FIG. 10 (7), and the color conversion process is executed by the process of step S26. As a result, the ink quantity data of the target pixel is (C, M, Y, K)=(0%, 30%, 30%, 20%).

The density adjustment (increase) process is then applied to the color ink quantity of the target pixel by the process of step S32 as shown in FIG. 10 (8). The ink quantity data (C, M, Y)=(0%, 30%, 30%) is increased 50% according to the density adjustment value of +50%, resulting in (C', M', Y')=(0%, 45%, 45%).

The density adjustment (increase) process is likewise applied to the black ink quantity of the target pixel by the process of step S33 as shown in FIG. 10 (9). The ink quantity of K=20% is increased 10% according to the density adjustment value of +10%, and becomes K'=22%.

This embodiment therefore does not change the color conversion table 127 even when the density adjustment is an increase if the reference table will suffice, and can changes in color when the table changes.

A preferred embodiment and variation thereof are described above, but when the color conversion table 127 changes when density is increased, the user can be informed of the possibility of a change in the desired colors. In this case the driver 12 executes a process to display an appropriate message on the display device of the host computer 1.

The color conversion table 127 may also be changed for an adjustment that reduces density.

In an image processing device as described in the embodiment and variation of the invention described above, ink deposition changes proportionally to a user-input value because a process according to the density adjustment value specified by the user is applied to the ink deposition data (ink quantity data) used by the printer 2. The user can therefore control the ink quantity (amount of color material) by means of a density adjustment operation, and user needs such as preventing bleeding and bleed-through, reducing cost by reducing ink quantity, providing sufficient fill-in, can be easily met.

Density adjustment can also be applied separately to color and black, and the ink quantity can be increased or decreased by using separate density adjustment values. It is therefore possible to reduce total ink deposition without reducing the quality of black text and barcodes, for example.

Furthermore, because a color conversion table with a defined maximum total ink deposition is used and density is increased within the scope of the table, the problem of excessive ink deposition can also be suppressed.

Furthermore, because the color conversion table is not changed even when adjustment increases density if the total ink deposition of the table referenced for the print conditions will suffice as described in the foregoing variation, changes in color can be prevented.

Note that while the foregoing embodiment describes an image processing device for a line head inkjet printer, the device of the invention can also be applied to other types of printers.

Yet further, the process performed by the driver 12 according to this embodiment of the invention can be executed by a controller 13 on the printer 2 side, or split between the host computer 1 and printer 2.

The invention having being thus described, it will be apparent to one skilled in the art in light of this disclosure that the invention may be varied in many ways. Such variations are not to be regarded as a departure from the spirit and scope of the invention. Rather, all such variations and modifications are intended to be encompassed by the invention to the extent the same falls within the scope of the following claims.

What is claimed is:

1. An image processing device capable of communicating with an image recording device, the image processing device comprising:

a color conversion unit that converts image data expressed in a first color space to ink quantity data in a second color space defined by multiple color components and generates material amount data in which each color component of each pixel of the ink quantity data is expressed by an amount of material, for use by an image recording device;

a density adjustment unit that increases or decreases the amount of material of each color component of the ink quantity data based on at least one specified adjustment value;

a dot breakdown unit that converts the increased or decreased amount of material for each pixel of the ink quantity data to dot quantity data expressed as a dot quantity for each of different sizes of dots to be formed by the image recording device; and a halftone process unit that converts the dot quantity data to data denoting which of the dots are to be formed.

2. The image processing device described in claim 1, wherein:

the at least one adjustment value includes an adjustment value specified for chromatic color and an adjustment value specified for black; and the density adjustment unit increases or decreases the amount of material for each chromatic color based on the adjustment value specified for chromatic color, and increases or decreases the amount of material for black based on the adjustment value specified for black.

3. The image processing device described in claim 1, further comprising:

a plurality of color conversion tables correlating the image data and the material amount data so that the total material amount of the ink quantity data is within a limit value, the plurality of color conversion tables having different limit values;

wherein the color conversion unit selects a particular color conversion table based on the at least one specified adjustment value, and applies the conversion using the selected color conversion table.

4. The image processing device described in claim 3, wherein:

the color conversion unit selects a color conversion table with a greater limit value than a reference color conversion table when the at least one specified adjustment value denotes a density increase.

5. The image processing device described in claim 4, wherein:

when the material amount data produced by the conversion process of the color conversion unit is increased to a value exceeding the density increase denoted by the at least one specified adjustment value as a result of selecting a color conversion table with a high limit value, the density adjustment unit reduces the excess amount.

6. The image processing device described in claim 3, wherein:

when the maximum of the total material amount of the ink quantity data obtained after processing by the density adjustment unit does not exceed the limit value of the reference color conversion table when the reference color conversion table is used, the color conversion unit selects the reference color conversion table.

7. An image processing method comprising:

performing a color conversion comprising converting image data expressed in a first color space to ink quantity data in a second color space defined by multiple color components and generating material amount data in which each color component of each pixel of the ink quantity data is expressed by an amount of material, used for printing;

adjusting the density by increasing or deceasing the amount of material of each color component of the ink quantity data based on at least one specified adjustment value;

converting the increased or decreased amount of material for each pixel of the ink quantity data to dot quantity data expressed as a dot quantity for each of different sizes of dots to be formed on a print medium; and converting the dot quantity data to data denoting which of the dots are to be formed.

8. The image processing method described in claim 7, wherein:

the at least one adjustment value includes an adjustment value specified for chromatic color and an adjustment value specified for black; and the adjusting step increases or decreases the amount of material for each chromatic color based on the adjustment value specified for chromatic color, and increases or decreases the amount of material for black based on the adjustment value specified for black.

9. The image processing method described in claim 7, wherein:

the color conversion step includes a step of selecting a color conversion table based on the at least one specified adjustment value from among a plurality of color conversion tables that each have a different limit value and correlate the image data and the material amount data so that the total material amount of the ink quantity data is within the limit value, and applying the conversion using the selected color conversion table.

10. The image processing method described in claim 9, wherein:

the color conversion step includes selecting a color conversion table with a greater limit value than a reference color conversion table when the at least one specified adjustment value denotes a density increase.

11. The image processing method described in claim 10, wherein:

when the material amount data produced by the conversion process of the color conversion step is increased to a value exceeding the density increase denoted by the at least one specified adjustment value as a result of selecting a color conversion table with a high limit value, the adjusting step reduces the excess amount.

12. The image processing method described in claim 9, wherein:

when the maximum of the total material amount of the ink quantity data obtained after processing by the density adjustment step does not exceed the limit value of the reference color conversion table when the reference color conversion table is used, the color conversion step selects the reference color conversion table.

13. A non-transitory computer-readable recording medium containing an image processing program that, when executed, causes an image processing device to execute steps of:

performing a color conversion that converts image data expressed in a first color space to ink quantity data in a second color space defined by multiple color components and generating material amount data in which each color component of each pixel of the ink quantity data is expressed by an amount of material, used for printing;

adjusting the density by increasing or decreasing the amount of material of each color component of the ink quantity data based on at least one specified adjustment value;

converting the increased or decreased amount of material for each pixel of the ink quantity data to dot quantity data expressed as a dot quantity for each of different sizes of dots to be formed on a print medium; and converting the dot quantity data to data denoting which of the dots are to be formed.

\* \* \* \* \*